(12) United States Patent
Lee et al.

(10) Patent No.: US 11,907,424 B2
(45) Date of Patent: Feb. 20, 2024

(54) HAPTIC MOTOR DRIVING METHOD IN CONSIDERATION OF USER INPUT SIGNAL

(71) Applicant: DONG WOON ANATECH CO., LTD, Seoul (KR)

(72) Inventors: Jeonghoon Lee, Yongin-si (KR); Inwoo Han, Seoul (KR); Dongpil Ju, Incheon (KR)

(73) Assignee: DONG WOON ANATECH CO., LTD, Seoul (KR)

( * ) Notice: Subject to any disclaimer, the term of this patent is extended or adjusted under 35 U.S.C. 154(b) by 364 days.

(21) Appl. No.: 17/406,013

(22) Filed: Aug. 18, 2021

(65) Prior Publication Data
US 2021/0382509 A1 Dec. 9, 2021

Related U.S. Application Data

(63) Continuation of application No. PCT/KR2020/002435, filed on Feb. 19, 2020.

(30) Foreign Application Priority Data

Feb. 19, 2019 (KR) .......................... 10-2019-0019171

(51) Int. Cl.
*G06F 3/01* (2006.01)
(52) U.S. Cl.
CPC ...................... *G06F 3/016* (2013.01)
(58) Field of Classification Search
None
See application file for complete search history.

(56) References Cited

U.S. PATENT DOCUMENTS

| | | | |
|---|---|---|---|
| 10,152,126 B2* | 12/2018 | Rank | G08B 6/00 |
| 11,738,262 B2* | 8/2023 | Ito | G06F 8/38 |
| | | | 463/36 |
| 2019/0319726 A1* | 10/2019 | Heubel | A63F 13/285 |

FOREIGN PATENT DOCUMENTS

| | | |
|---|---|---|
| KR | 11-1121785 B1 | 3/2012 |
| KR | 10-2014-0030053 A | 3/2014 |
| KR | 10-1427993 B1 | 8/2014 |
| KR | 10-2014-0114238 A | 9/2014 |
| KR | 10-2014-0135669 A | 11/2014 |
| KR | 10-2015-0144704 A | 12/2015 |
| KR | 10-2018-0062174 A | 6/2018 |

OTHER PUBLICATIONS

International Search Report issued in PCT/KR2020/002435; dated Jul. 9, 2020.

* cited by examiner

*Primary Examiner* — Paul W Huber
(74) *Attorney, Agent, or Firm* — Studebaker & Brackett PC

(57) ABSTRACT

The present invention relates to a haptic motor driving method including: analyzing a received audio signal; extracting a corresponding haptic event signal when a result of the analysis is equal to or larger than a specific threshold value; generating a haptic signal corresponding to the extracted haptic event signal; and multiplexing pre-stored haptic data and the generated haptic signal by considering whether a first user input signal is received, and outputting a driving signal driving a haptic motor, and basically, a haptic signal is generated from an audio sound, but a system is configured in the form of responding to an input of a user, thereby providing a more realistic haptic result.

7 Claims, 5 Drawing Sheets

HAPTIC MOTOR DRIVING METHOD IN CONSIDERATION OF USER INPUT SIGNAL

CROSS-REFERENCE TO RELATED APPLICATIONS

The present application is a continuation of International Patent Application No. PCT/KR2020/002435, filed on Feb. 19, 2020, which is based upon and claims the benefit of priority to Korean Patent Application No. 10-2019-0019171, filed on Feb. 19, 2019. The disclosures of the above-listed applications are hereby incorporated by reference herein in their entirety.

TECHNICAL FIELD

The present invention relates to a haptic motor driving method, and more particularly, to a method and a device for driving a haptic motor, in which a haptic signal is generated from an audio sound, but a system is configured in a form that responds to an input of a user, thereby providing a more realistic haptic result.

BACKGROUND ART

Products that support haptic technology enable users to feel more realistic and immersive by adding tactile information. However, in order to implement the haptic technology by using contents that do not include tactile information in the past, a vibration pattern must be planted in the corresponding content in advance for a specific time and purpose when the contents are played, thereby requiring a lot of time, effort, and cost. In order to solve the problem, when there is an existing audio signal, a haptic technology that automatically converts the audio signal to a haptic signal is required.

Reviewing the existing technology, most representatively, when an audio signal is converted into a haptic signal, the audio signal is analyzed in the time domain or the frequency domain, a signal focused on a specific region is drawn by using a filter, and the drawn signal is connected as a haptic signal. In this case, an algorithm is the form of simply converting a sound to haptic, so that the events of all of the sounds are inevitably connected to haptic events.

Prior Art 1 (Korean Patent No. 10-1121785) is the technology of determining a change type according to the amount of change in sound source data and generating a haptic effect based on the determined type of change, and Prior Art 2 (Korean Patent No. 10-1427993) is the technology of outputting a haptic signal corresponding to perceptual characteristic information of an audio signal.

Prior Art 1 or Prior Art 2 generates the haptic effect based on only the amount of change in the sound source data or the perceptual characteristic information but does not disclose the technology of selecting a pre-stored haptic data output and a haptic signal extracted from an audio signal according to a user input signal and outputting the selected signal.

Accordingly, since the existing method is the algorithm in the form of simply converting a sound into haptic, it is impossible to perform a complementary operation according to a user's input, and in the case of uniformly detecting and outputting a haptic signal from an audio signal, there is a problem in that it is difficult to optimize a different tactile environment for each user.

DISCLOSURE

Technical Problem

Accordingly, the first problem to be solved by the present invention is to provide a haptic motor driving method in which a haptic signal is basically generated from an audio sound, but a system is configured in a form that responds to an input of a user, thereby providing a more realistic haptic result.

The second problem to be solved by the present invention is to provide a haptic motor driving device which outputs a haptic signal by preferentially considering a user input, and thus does not fundamentally respond to an unwanted audio signal.

Further, the present invention provides a computer readable recording medium in which a program for executing the method in a computer is recorded.

Technical Solution

In order to achieve the first problem, the present invention provides a method of driving a haptic motor, the method including: analyzing a received audio signal; extracting a corresponding haptic event signal when a result of the analysis is equal to or larger than a specific threshold value; generating a haptic signal corresponding to the extracted haptic event signal; and multiplexing pre-stored haptic data and the generated haptic signal by considering whether a first user input signal is received, and outputting a driving signal driving a haptic motor.

According to an exemplary embodiment of the present invention, a gain of the pre-stored haptic data may be controlled by considering a size of the analyzed audio signal or a size of the haptic event signal.

Further, whether to drive the haptic motor according to the haptic data or the haptic signal may be determined by considering whether a second user input signal is received.

In order to achieve the second problem, the present invention provides a device for driving a haptic motor, the device including: an audio signal analyzing unit configured to analyze a received audio signal; a haptic event extracting unit configured to extract a corresponding haptic event signal when a result of the analysis is equal to or larger than a specific threshold value; a haptic signal generating unit configured to generate a haptic signal corresponding to the extracted haptic event signal; a user input unit configured to receive an input signal from a user; a multiplexer configured to multiplex pre-stored haptic data and the generated haptic signal by considering a first user input signal received from the user input unit and output a driving signal driving a haptic motor; and a motor driving unit configured to drive the haptic motor by using the driving signal output from the multiplexer.

According to an exemplary embodiment of the present invention, the device may further include a control unit configured to control a gain of the pre-stored haptic data by considering a size of the analyzed audio signal or a size of the haptic event signal.

Further, whether to drive the haptic motor according to the haptic data or the haptic signal may be determined by considering whether a second user input signal is received.

In order to solve another technical problem, the present invention provides a computer-readable recording medium in which a program for executing the method of driving the haptic motor in a computer is recorded.

Advantageous Effects

According to the present invention, the present invention basically generates a haptic signal from an audio sound, but the system is configured in the form of responding to an input of a user, thereby providing a more realistic haptic result.

Further, according to the present invention, when the present invention outputs a haptic signal by preferentially considering a user input, it is possible not to fundamentally respond to an unwanted audio signal.

Furthermore, according to the present invention, when a haptic output of an audio signal is output through interaction with a user input, the present invention may also additionally receive input information of a user without depending solely on the audio signal. Accordingly, when the audio signal is converted into haptic signals by using both two types of information, it is possible to obtain vibrations with higher satisfaction.

BEST MODE

In order to solve the problem, the present invention provides a method of driving a haptic motor, the method including: analyzing a received audio signal; extracting a corresponding haptic event signal when a result of the analysis is equal to or larger than a specific threshold value; generating a haptic signal corresponding to the extracted haptic event signal; and multiplexing pre-stored haptic data and the generated haptic signal by considering whether a first user input signal is received, and outputting a driving signal driving a haptic motor.

MODE FOR CARRYING OUT THE INVENTION

Hereinafter, exemplary embodiments will be described in detail with reference to the accompanying drawings so that those skilled in the art can easily implement the present invention. However, the exemplary embodiments are for describing the present invention in more detail, and it will be apparent to those skilled in the art that the scope of the present invention is not limited thereto.

The configuration of the invention for clarifying the solution to the problem to be solved by the present invention will be described in detail with reference to the accompanying drawings based on the exemplary embodiment of the present invention, and it should be noted in advance that in assigning reference numerals to the components of the drawings, the same reference numeral is assigned to the same component even though the component is included in a different drawing, and components of other drawings may be cited if necessary when the drawing is described. In the detailed description of an operation principle of the exemplary embodiment of the present invention, when a detailed description and the various matters of a related publicly known function or constituent element are determined to unnecessarily make the subject matter of the present invention unclear, the detailed description thereof will be omitted.

Figure 1:
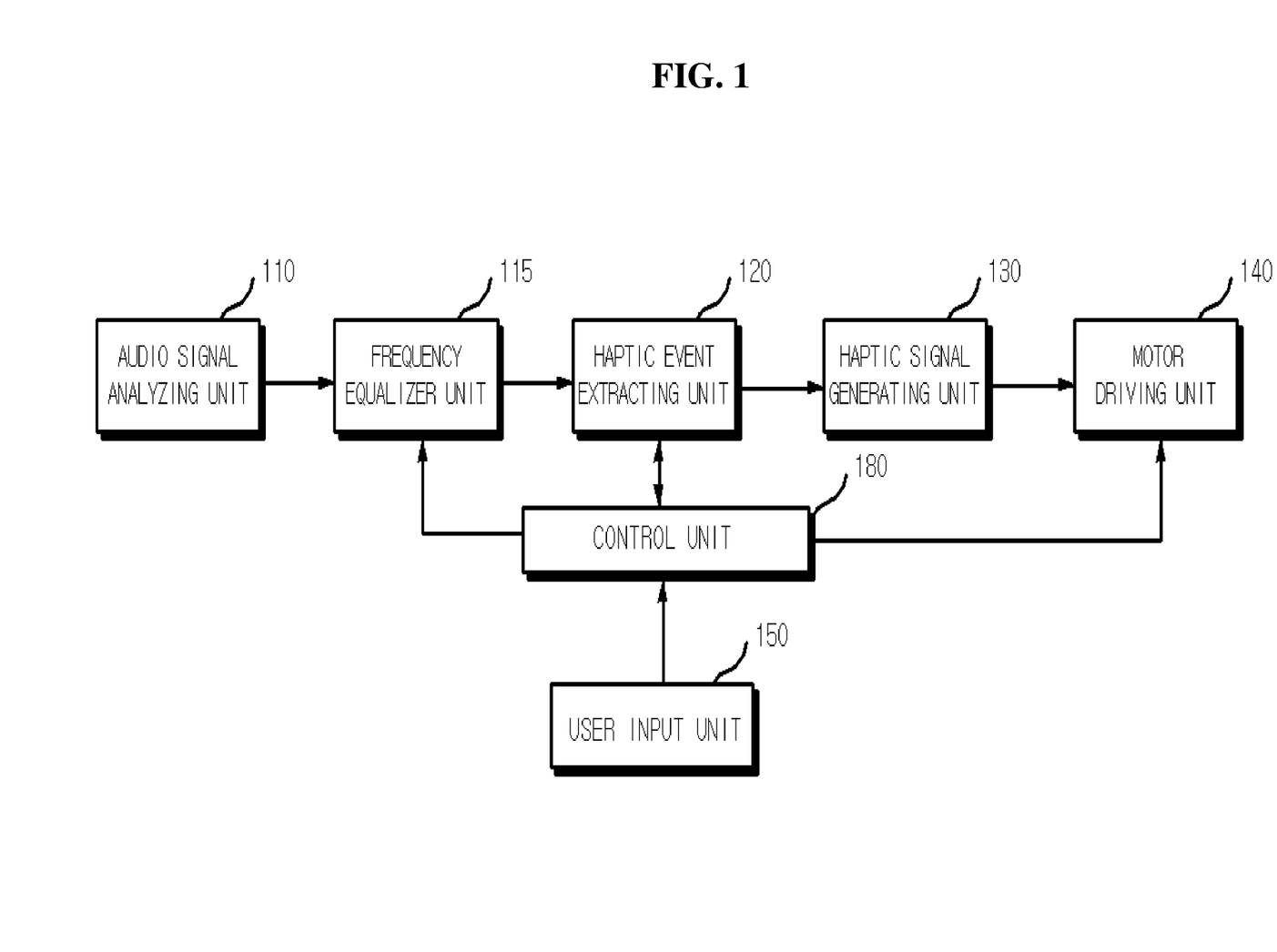
FIG. 1 is a configuration diagram of a haptic motor driving device according to an exemplary embodiment of the present invention.

FIG. 1 is a configuration diagram of a haptic motor driving device according to an exemplary embodiment of the present invention.

Referring to FIG. 1, a haptic motor driving device according to an exemplary embodiment of the present invention includes an audio signal analyzing unit 110, a frequency equalizer unit 115, a haptic event extracting unit 120, a haptic signal generating unit 130, a motor driving unit 140, a user input unit 150, and a control unit 180.

The audio signal analyzing unit 110 analyzes a received audio signal.

The audio signal analyzing unit 110 may analyze the received audio signal in a time domain or convert the received audio signal into a frequency domain and analyze the received audio signal. When the audio signal is converted into the frequency domain, the audio signal may be converted into the frequency domain for each frequency band by using Fast Fourier Transform (FFT).

The frequency equalizer unit 115 suppresses or amplifies a specific frequency section of the audio signal converted into the frequency domain.

The frequency equalizer unit 115 may include a low pass filter that cuts out a low pass and a high pass filter that cuts out a high pass, a band pass filter that removes only a specific frequency and allows the remaining portions to pass through, and a band reject filter that selects and removes only a specific frequency and may use a combination thereof.

The haptic event extracting unit 120 extracts a haptic event signal corresponding to the case where the analyzed result is equal to or larger than a specific threshold value.

The haptic event signal may be extracted by considering at least one of intensity, pitch, rhythm, energy, temporal contrast, melody, harmony, and timbre of the received audio signal.

The haptic signal generating unit 130 generates a haptic signal corresponding to the extracted haptic event signal.

As an exemplary embodiment, by pitch-shifting the audio signal, an original pitch of the audio signal may be shifted to a target pitch within a target pitch range of a haptic output device, such as an actuator. Further, by shifting the original pitch of the audio signal to the target pitch, one or more original frequencies of the audio signal may be shifted to one or more target frequencies.

The motor driving unit 140 drives the haptic motor by receiving the haptic signal from the haptic signal generating unit 130.

The user input unit 150 receives an input signal that controls driving of the motor driving unit 140 from a user, and outputs a user input signal to the control unit 180.

In the case where the motor driving unit 140 drives the haptic motor according to the haptic signal of the haptic signal generating unit 130, when the user input signal is received from the user input unit 150, the control unit 180 may stop the driving of the haptic motor by controlling the motor driving unit 140.

In contrast, in the case where the haptic motor is stopped, when the user input signal is received from the user input unit 150, the control unit 180 may drive the haptic motor according to the haptic signal of the haptic signal generating unit 130.

The control unit 180 counts the number of times of the generation of the haptic event signal extracted by the haptic event extracting unit 120 for each frequency, and increases a frequency gain of the frequency corresponding to the haptic event signal that has generated a predetermined number of times or more as a result of the counting.

When the control unit 180 counts the number of times of the generation of the haptic event signal for each frequency, the control unit 180 may exclude the case where a size of power corresponding to the corresponding frequency is equal to or smaller than a predetermined size from the counting.

In the meantime, as a result of the counting, frequencies other than the frequency corresponding to the haptic event signal that has generated the predetermined number of times or more may be suppressed.

When the haptic event signal extracted by the haptic event extracting unit 120 is generated the predetermined number of times or more as the result of the counting of the number of times of the generation of the haptic event signal, the control unit 180 may increase a specific threshold value of the haptic event extracting unit 120. When the specific threshold value is increased, there is an effect of reducing the frequency of generation of the haptic signal.

Further, the control unit 180 may more precisely divide a specific frequency section of the frequency equalizer unit 115 by analyzing the frequency corresponding to the haptic event signal that has generated the predetermined number of times or more. For example, when an initially set specific frequency section is 1,000 Hz to 1,500 Hz, and the frequencies at which the haptic event signal is generated are 1,100 Hz, 1,150 Hz, 1,180 Hz, and 1,200 Hz, the specific frequency section may be limited to 1,100 Hz to 1,200 Hz.

The control unit 180 extracts the haptic event signal from the real-time received audio signal, increases an amplification gain of the frequency corresponding to the extracted haptic event signal, and decreases amplification gains of other frequencies, thereby adaptively generating a haptic signal according to the characteristic of the audio signal.

Manual tuning required for the audio signal analyzing unit 110 and the haptic event extracting unit 120 may be automated to some extent through the control unit 180. Further, basically, when the frequency for an audio signal having a specific frequency, such as a game, is high, an output has a higher hit ratio.

Because audio signals exist in various forms in real life, it is virtually impossible to specify a specific form, so that the received audio signal is adaptively learned, and a haptic event hit ratio may be improved by controlling the control unit 180 which analyzes the audio signal according to a result of the learning.

Figure 2:
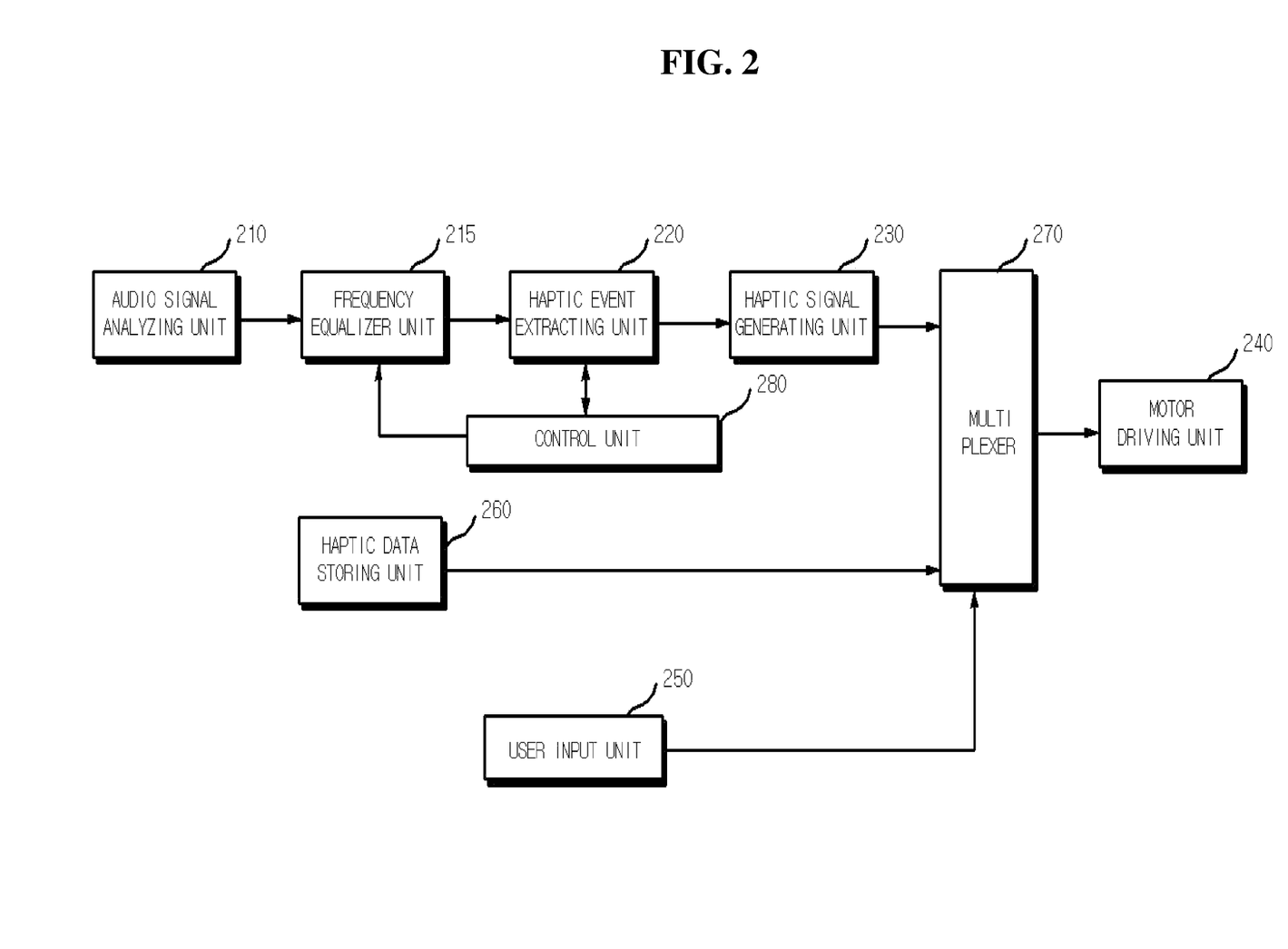
FIG. 2 is a configuration diagram of a haptic motor driving device according to another exemplary embodiment of the present invention.

FIG. 2 is a configuration diagram of a haptic motor driving device according to another exemplary embodiment of the present invention.

Referring to FIG. 2, a haptic motor driving device according to the present exemplary embodiment includes an audio signal analyzing unit 210, a frequency equalizer unit 215, a haptic event extracting unit 220, a haptic signal generating unit 230, a motor driving unit 240, a user input unit 250, a haptic data storing unit 260, a multiplexer 270, and a control unit 280.

The audio signal analyzing unit 210, the frequency equalizer unit 215, the haptic event extracting unit 220, the haptic signal generating unit 230, the motor driving unit 240, the user input unit 250, and the control unit 280 illustrated in FIG. 2 have the same functions as the constituent elements illustrated in FIG. 1, so that the description thereof will be omitted, and the difference will be mainly described below.

The haptic data storing unit 260 stores haptic data corresponding to an input signal received through the user input unit 250. The user input signal may be variously formed, and corresponding haptic data may also be formed in various forms.

The haptic data according to the input signal of the user is regarded as an important form of haptic information and may be configured with previously stored haptic data in order to give high satisfaction to a user.

The user input unit 250 receives an input signal controlling the multiplexer 270 from the user, and outputs the received input signal to the multiplexer 270.

The multiplexer 270 multiplexes the haptic data stored in the haptic data storing unit 260 and the haptic signal generated in the haptic signal generating unit 230 by considering a first user input signal received from the user input unit 250 and outputs a driving signal driving the haptic motor to the motor driving unit 240.

For example, in the case where the haptic data stored in the haptic data storing unit 260 is output to the motor driving unit 240 through the multiplexer 270, when the user input signal is received in the user input unit 250, the haptic signal generated in the haptic signal generating unit 230 may be changed to be output to the motor driving unit 240 through the multiplexer 270.

In contrast, in the case where the haptic signal generated in the haptic signal generating unit 230 is output to the motor driving unit 240 through the multiplexer 270, when the user input signal is received in the user input unit 250, the haptic data stored in the haptic data storing unit 260 may be changed to be output to the motor driving unit 240 through the multiplexer 270.

For another example, in the case where only any one of the haptic data stored in the haptic data storing unit 260 and the haptic signal generated in the haptic signal generating unit 230 is output to the motor driving unit 240 through the multiplexer 270, when the user input signal is received in the user input unit 250, both the haptic data and the haptic signal may be changed to be output to the motor driving unit 240 through the multiplexer 270.

The haptic motor driving device according to the exemplary embodiment of the present invention may be based on an input command of the user when previously prepared haptic data is additionally output as an output, in addition to the audio signal, and when the user input is applied, the haptic motor driving device may temporarily stop the function of converting the audio signal into a haptic signal and connect specific haptic data to an output. Then, when the output of the specific haptic data is completed, the haptic motor driving device may be operated in the original form in which the audio signal is converted into the haptic signal, thereby generating the more realistic haptic signal for the user.

The motor driving unit 240 drives the haptic motor by using the driving signal output from the multiplexer 270.

Figure 3:
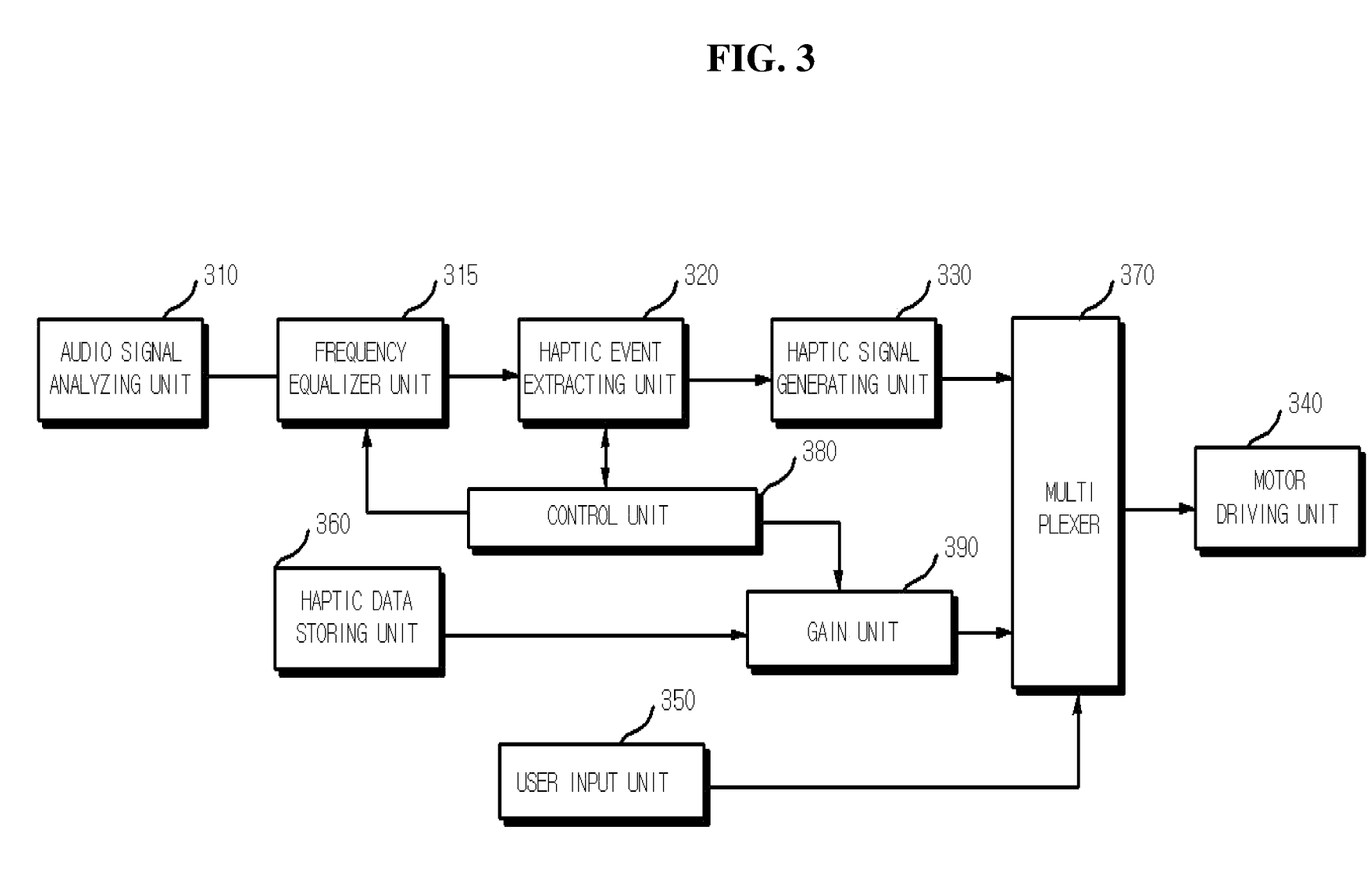
FIG. 3 is a configuration diagram of a haptic motor driving device according to still another exemplary embodiment of the present invention.

FIG. 3 is a configuration diagram of a haptic motor driving device according to still another exemplary embodiment of the present invention.

Referring to FIG. 3, a haptic motor driving device according to the present exemplary embodiment includes an audio signal analyzing unit 310, a frequency equalizer unit 315, a haptic event extracting unit 320, a haptic signal generating unit 330, a motor driving unit 340, a user input unit 350, a haptic data storing unit 360, a multiplexer 370, a control unit 380, and a gain unit 390.

The audio signal analyzing unit 310, the frequency equalizer unit ccc315, the haptic event extracting unit 320, the haptic signal generating unit 330, the motor driving unit 340, the user input unit 350, the haptic data storing unit 360, the multiplexer 370, and the control unit 380 illustrated in FIG. 3 have the same functions as the constituent elements illustrated in FIG. 2, so that the description thereof will be omitted, and the difference will be mainly described below.

The control unit 380 controls a gain of haptic data stored in the haptic data storing unit 360 through the gain unit 390 by considering a size of an audio signal analyzed in the audio signal analyzing unit 310 or a size of a haptic event signal extracted in the haptic event extracting unit 320.

In this case, the haptic data stored in the haptic data storing unit 360 may be stored as normalized data.

In order to match the scale with the haptic signal generated in the haptic signal generating unit 330, the gain unit 390 applies the gain to the normalized haptic data stored in the haptic data storing unit 360 and outputs the haptic data to the multiplexer 370.

In order to adjust the size of vibration of the pre-stored haptic data into various forms, the gain unit 390 may analyze a characteristic of an audio signal given as an input, adjust a gain value of the pre-stored haptic data based on the analyzed characteristic of the audio signal, and provides the adjusted gain value as an output.

Figure 4:
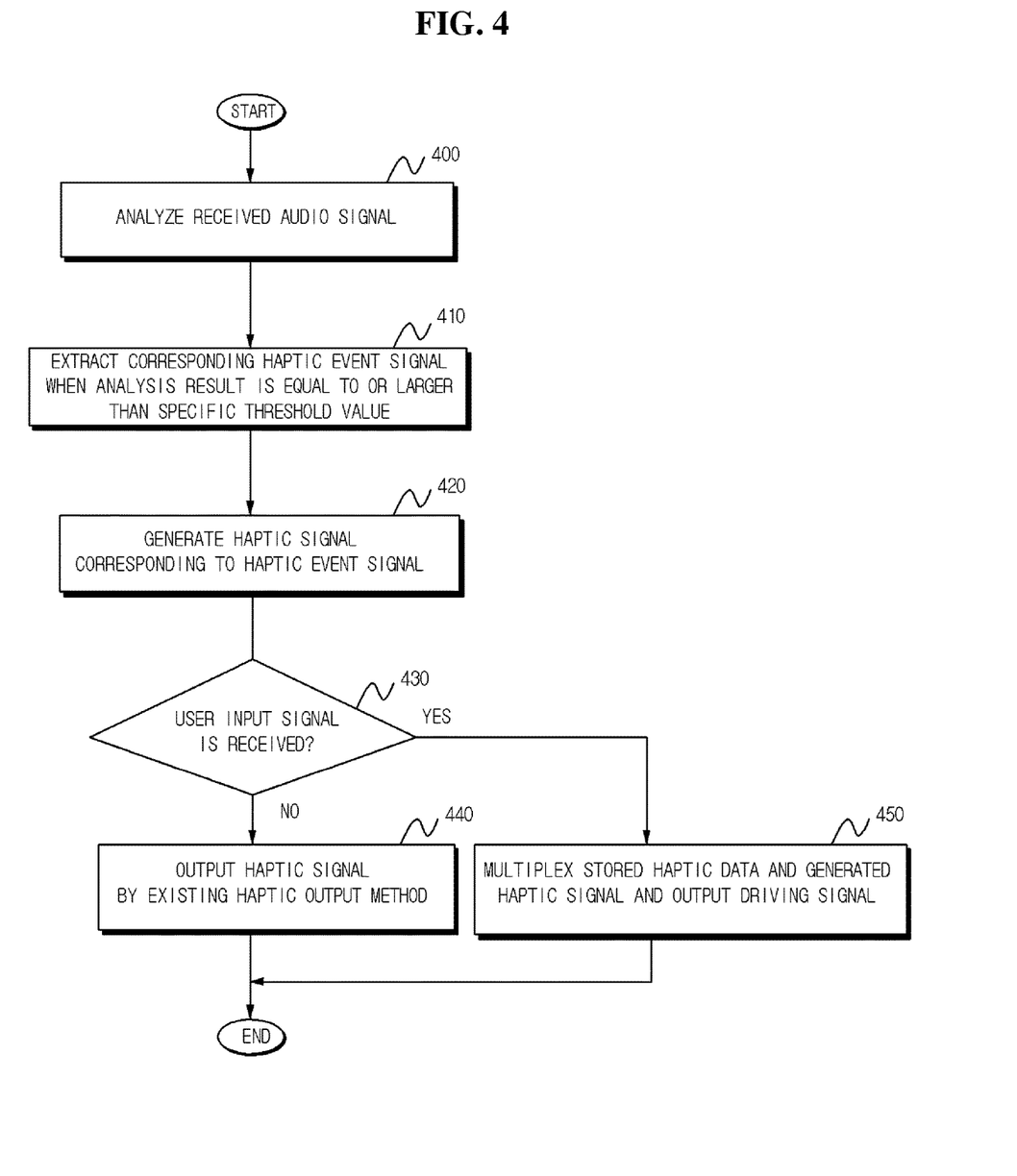
FIG. 4 is a flowchart of a haptic motor driving method according to an exemplary embodiment of the present invention.

FIG. 4 is a flowchart of a haptic motor driving method according to an exemplary embodiment of the present invention.

Referring to FIG. 4, a haptic motor driving method according to the present exemplary embodiment includes the operations time-serially processed in the haptic motor driving device illustrated in FIG. 2. Accordingly, even if omitted below, the contents described above with respect to the haptic motor driving device illustrated in FIG. 2 is also applied to the haptic motor driving method according to the present exemplary embodiment.

In operation 400, the haptic motor driving device analyzes a received audio signal. The received audio signal may be analyzed in a time domain or may be converted into a frequency domain and analyzed. When the audio signal is converted into the frequency domain, the audio signal may be converted into the frequency domain for each frequency band by using Fast Fourier Transform (FFT).

In operation 410, when the result analyzed in operation 400 is equal to or larger than a specific threshold value, the haptic motor driving device extracts a corresponding haptic event signal.

The haptic event signal may be extracted by considering at least one of intensity, pitch, rhythm, energy, temporal contrast, melody, harmony, and timbre of the received audio signal.

In operation 420, the haptic motor driving device generates a haptic signal corresponding to the haptic event signal extracted in operation 410.

As an exemplary embodiment, by pitch-shifting the audio signal, an original pitch of the audio signal may be shifted to a target pitch within a target pitch range of a haptic output device, such as an actuator. Further, by shifting the original pitch of the audio signal to the target pitch, one or more original frequencies of the audio signal may be shifted to one or more target frequencies.

In operation 430, the haptic motor driving device determines whether a user input signal is received. When the user input signal is not received as a result of the determination, the haptic motor driving device proceeds to operation 440, and when the user input signal is received as a result of the determination, the haptic motor driving device proceeds to operation 450.

In operation 440, the user input signal is not received, so that the haptic motor driving device outputs a haptic signal by an existing haptic output method.

In the existing haptic output method, haptic data stored in the haptic data storing unit 260 may be output, and a haptic signal generated in the haptic signal generating unit 230 may also be output, and other methods are available.

In operation 450, the user input signal is received, so that the haptic motor driving device multiplexes the pre-stored haptic data and the generated haptic signal and outputs a driving signal driving the haptic motor.

When the user input signal is received, the haptic motor driving device outputs the haptic signal by a different method from the existing haptic output method. As an exemplary embodiment, in the case where the existing haptic data stored in the haptic data storing unit 260 is output, when the user input signal is received, the haptic motor driving device may output the haptic signal generated in the haptic signal generating unit 230, and in the case where the existing haptic signal generated in the haptic signal generating unit 230 is output, when the user input signal is received, the haptic motor driving device may output the existing haptic data stored in the haptic data storing unit 260.

In order to overcome the limitations inevitably occurring when an existing audio signal is converted into a haptic signal, the haptic motor driving device according to the present invention may connect additionally and previously prepared haptic data as an output, in addition to the detection of the haptic signal from the existing audio signal. Accordingly, the haptic motor driving device interacts with the user, thereby guaranteeing a haptic output more faithful to the user input information.

Figure 5:
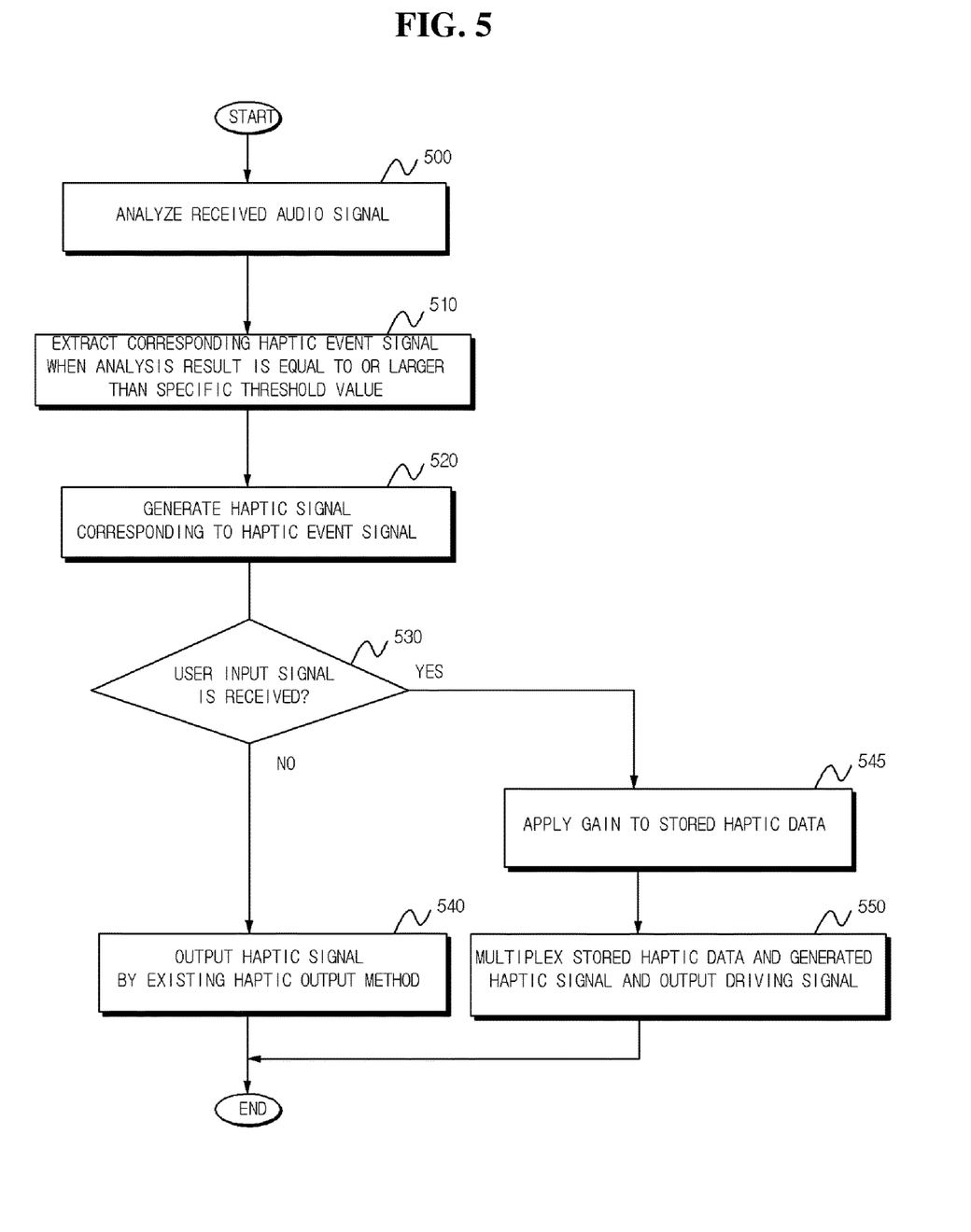
FIG. 5 is a flowchart of a haptic motor driving method according to another exemplary embodiment of the present invention.

FIG. 5 is a flowchart of a haptic motor driving method according to another exemplary embodiment of the present invention.

Referring to FIG. 5, a haptic motor driving method according to the present exemplary embodiment includes the operations time-serially processed in the haptic motor driving device illustrated in FIG. 3. Accordingly, even if omitted below, the contents described above with respect to the haptic motor driving device illustrated in FIG. 3 is also applied to the haptic motor driving method according to the present exemplary embodiment.

The haptic motor driving device in operations 500 to 550 operates including operations 400 to 450 disclosed in FIG. 4.

In operation 530, the haptic motor driving device determines whether a user input signal is received. When the user input signal is not received as a result of the determination, the haptic motor driving device proceeds to operation 540, and when the user input signal is received as a result of the determination, the haptic motor driving device proceeds to operation 550.

In operation 540, the user input signal is not received, so that the haptic motor driving device outputs a haptic signal by an existing haptic output method.

In the existing haptic output method, haptic data stored in the haptic data storing unit 360 may be output, and a haptic signal generated in the haptic signal generating unit 330 may also be output, and other methods are available.

In operation 545, the haptic motor driving device applies a gain to the pre-stored haptic data by considering a size of the audio signal analyzed in operation 500 or a size of the haptic event signal of operation 510.

In operation 550, the haptic motor driving device multiplexes the haptic data to which the gain is applied in operation 545 and the haptic signal generated in operation 520 and outputs a driving signal driving the haptic motor.

As an exemplary embodiment, in the case where the haptic motor driving device outputs the haptic data by applying the gain to the existing haptic data stored in the haptic data storing unit 360, when the user input signal is received, the haptic motor driving device may output the haptic signal generated in the haptic signal generating unit 330, and in the case where the haptic motor driving device outputs the existing haptic signal generated in the haptic signal generating unit 330, when the user input signal is received, the haptic motor driving device may output the haptic data by applying the gain to the existing haptic data stored in the haptic data storing unit 360.

The exemplary embodiments of the present invention may be implemented in the form of a program command that can be executed through various computer means and recorded in a computer readable medium. The computer readable medium may include a program command, a data file, a data structure, and the like alone or in combination. The program command recorded in the medium may be specially designed and configured for the present invention or may also be known and usable to those skilled in computer software. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions, and substitutions are possible from the disclosure.

Accordingly, the spirit of the present invention shall not be determined while being limited to the foregoing exemplary embodiments, and it will be considered that all matters having equivalent or equivalent modifications to the claims are within the scope of the present invention.

The invention claimed is:

1. A method of driving a haptic motor, the method comprising:
   analyzing a received audio signal;
   extracting a corresponding haptic event signal when a result of the analysis is equal to or larger than a specific threshold value;
   generating a haptic signal corresponding to the extracted haptic event signal; and
   multiplexing pre-stored haptic data and the generated haptic signal by considering whether a first user input signal is received, and outputting a driving signal driving a haptic motor.

2. The method of claim 1, further comprising:
   controlling a gain of the pre-stored haptic data by considering a size of the analyzed audio signal or a size of the haptic event signal.

3. The method of claim 1, wherein whether to drive the haptic motor according to the haptic data or the haptic signal is determined by considering whether a second user input signal is received.

4. A computer-readable recording medium in which a program for executing the method of claim 1 in a computer is recorded.

5. A device for driving a haptic motor, the device comprising:
   an audio signal analyzing unit configured to analyze a received audio signal;
   a haptic event extracting unit configured to extract a corresponding haptic event signal when a result of the analysis is equal to or larger than a specific threshold value;
   a haptic signal generating unit configured to generate a haptic signal corresponding to the extracted haptic event signal;
   a user input unit configured to receive an input signal from a user;
   a multiplexer configured to multiplex pre-stored haptic data and the generated haptic signal by considering a first user input signal received from the user input unit and output a driving signal driving a haptic motor; and
   a motor driving unit configured to drive the haptic motor by using the driving signal output from the multiplexer.

6. The device of claim 5, further comprising:
   a control unit configured to control a gain of the pre-stored haptic data by considering a size of the analyzed audio signal or a size of the haptic event signal.

7. The device of claim 5, wherein whether to drive the haptic motor according to the haptic data or the haptic signal is determined by considering whether a second user input signal is received.

* * * * *